United States Patent [19]

Tilkanen

[11] 4,185,987
[45] Jan. 29, 1980

[54] METHOD OF PREPARING GROWTH SUBSTRATES HAVING A PREDETERMINED PARTICLE SIZE

[75] Inventor: Simo O. Tilkanen, Kyrö, Finland

[73] Assignee: Farmos-Yhtyma Oy, Turku, Finland

[21] Appl. No.: 880,799

[22] Filed: Feb. 24, 1978

[30] Foreign Application Priority Data

Mar. 9, 1977 [FI] Finland .................................. 770749

[51] Int. Cl.$^2$ ............................................. C05F 11/02
[52] U.S. Cl. ...................................... 71/24; 71/64 R; 71/64 A
[58] Field of Search ................. 71/64 B, 24, 23, 64 A, 71/64 R

[56] References Cited

U.S. PATENT DOCUMENTS

| 2,019,824 | 11/1935 | Liehr | 71/24 |
| 3,656,930 | 4/1972 | Martin | 71/24 |

FOREIGN PATENT DOCUMENTS

| 2103753 | 8/1971 | Fed. Rep. of Germany | 71/24 |
| 394654 | 6/1933 | United Kingdom | 71/24 |

Primary Examiner—Joseph Scovronek
Assistant Examiner—Chris P. Konkol
Attorney, Agent, or Firm—Toren, McGeady and Stanger

[57] ABSTRACT

A comminuted or particulated growth substrate is produced by extracting peat blocks from bog and drying these blocks to a moisture content of 10 to 30%. The blocks are thereafter compressed into a volume of ⅓ to 1/10 of their initial size and the particulated growth substrate is prepared from the compressed block by cutting or fraising.

5 Claims, No Drawings

METHOD OF PREPARING GROWTH SUBSTRATES HAVING A PREDETERMINED PARTICLE SIZE

This invention relates to a method of preparing a growth substrate of peat which substrate has a predetermined particle size and absorbs water and swells quickly.

The growth substrate prepared according to the invention is used as such or as a mixture in different kinds of plant pots, vessels or cultivating troughs made of plastic, paper, peat or the like.

In the method in question sphagnum peat (light peat) is used as raw material.

Growth substrates prepared by presently known methods from sphagnum peat exhibit several disadvantages, especially in cases where high demands are put on the physical characteristics of the growth substrate in pot planting, particularly when the filling of pots is concerned.

The peat growth substrate material presently most in use, is produced almost exclusively by extracting the peat from the bog surface by fraising whereby it generally forms a finely divided powder containing a large amount of dust and particles of different sizes. It is not possible to obtain an even particle size having ideal cultivating characteristics by this known method.

Another known process which is still somewhat in use concerns cutting the peat from the bog as blocks which are reduced in a shredding machine. In this case part of the peat will be obtained as large blocks and part as fine dust. Consequently, this method does not allow a regulation of the particle size during the production process either.

In both above mentioned production processes attempts have been made to improve the quality of the product by screening in order to obtain the desired particle distribution range. This, however, has the disadvantage that a large amount of peat is lost as waste which is either too fine or too coarse to be used as growth substrate. Thus up to one third of the total amount produced may be lost or can be sold only at a lesser price.

Loose peat prepared by above mentioned known methods also has a low specific weight of the order of 60 g/l, and the product must thus be baled using compression which naturally increases its production costs.

A substantial part of tree plants are nowadays cultivated in paper pots. These pots have no bottom and thus it is important to pack the filling tightly so as to prevent the material from falling out of the pot when lifting the same and so as to allow the roots of the plant to develop normally.

The paper pots often have a very small diameter, even 1.5 cm, and consequently the satisfactory filling of the pots using presently obtainable growth substrate materials is extremely difficult.

By means of the method according to the invention it is possible to prepare a filling material for pots which has the desired ideal physical properties for plant pots of this kind. When using the product in a dry state for the filling of pots it flows easily even into a small pot. After wetting, the product in the pot swells quickly, thus giving a tight filling. The same filling technique may be used also for other pots and cultivation troughs.

By means of the method according to the invention it is also possible to obtain an accurate predetermined particle size for any field of use, which also makes it possible to use fast automatic filling machines.

Dried peat in mulch form also does not easily absorb water. Planters often meet with excessive difficulties when trying to wet the peat in different ways before sowing or planting.

The present invention offers an excellent and new solution to all the afore mentioned disadvantages. It is thus possible to prepare a growth substrate having a certain predetermined particle size, without any material losses, which substrate is easy to pack tightly and which absorbs water quickly.

The characterizing features of this invention appear from the appended claims.

When testing different methods in order to obtain a predetermined particle size, blocks extracted from the bog in a natural state were used. Excellent results were obtained by using dried peat blocks which are pressed as such (without preceeding grinding) into dense plates and these plates were then finely divided still being in a compressed form by cutting or fraising. The peat plate was cut into chips or grit having a size of 0.5 to 2 mm. By controlling the thickness of the chips or the coarseness of the grit it is possible to strictly control the particle size of the final product. After wetting, the chips quickly absorb water and swell instantly into a size even 5 times the dry state. The peat particle retains its original texture such as it was initially in the bog before pressing and cutting. The texture is ideal for cultivating plants.

As the whole plate may be cut and fraised with cutting blades, also the impurities in the peat, such as coarse plant parts, roots of bushes and so forth become finely divided and utilized and thus no waste is formed.

By adjusting the particle size of the product to be cut or ground, a suitable plant growth substrate is obtained from the whole raw material amount for different fields of use. The cut peat chips are fertilized and limed in a manner known per se.

As the peat chips are already in a pressed state, no cumbersome baling is needed, but the product may be packed into conventional sacks by means of automatic machines.

EXAMPLE

From a bog is extracted peat blocks measuring 60×40×20 cm and these are left to dry on the bog. Thereafter the blocks are dried artificially to a water content of appr. 20 to 25%. In this example the dried blocks are pressed in hydraulic press almost to one tenth of their initial thickness. After pressing, the plates were about 18 mm thick. Five of these plates were stacked on top of each other and fed by means of feeding rolls against a rotating cutter the blade of which cut from the pressed plates chips having a thickness of 2 mm. Thus thin flakes or grains were obtained into which fertilizers were mixed. After adding the fertilizers, the peat grit was packed into sacks.

When using the peat thus prepared for cultivating, it when wetted, absorbed water within 10 to 15 seconds and from one sack of peat chips about five sacks of extremely airy homogenous growth substrate with a particle size of 4 to 5 mm, were obtained to be used as a growth substrate for plants.

I claim:

1. Method of preparing a growth substrate having a predetermined particle size, comprising the steps of extracting peat blocks in the natural state from a bog, drying the peat blocks to a moisture content of 10 to 30%, compressing the dried peat blocks in the range of ⅓ to 1/10 of their initial size, and reducing the compressed dried peat blocks into particles of a predetermined particle size.

2. Method, as set forth in claim 1, including reducing the compressed dried peat blocks by cutting the blocks.

3. Method, as set forth in claim 1, including reducing the compressed dried peat blocks by fraising the blocks.

4. Method, as set forth in claim 1, including reducing the compressed dried peat blocks by cutting thin slices off the compressed blocks.

5. Method, as set forth in claim 1, including extracting the peat blocks in a size of 60×40×20 cm, drying the peat blocks first by naturally drying the blocks by leaving them on the bog and then artificially drying the blocks to a water content of 20 to 25%, compressing the dried blocks to about 1/10 of the initial thickness, stacking a plurality of the pressed blocks one on top of the other and feeding the stack of pressed blocks against a rotating cutter and cutting chips off the pressed blocks having a thickness of 2 mm.

* * * * *